(12) United States Patent
Tanimura et al.

(10) Patent No.: US 10,853,719 B2
(45) Date of Patent: Dec. 1, 2020

(54) DATA COLLECTING DEVICE AND OPTICAL TRANSMISSION SYSTEM

(71) Applicant: FUJITSU LIMITED, Kawasaki (JP)

(72) Inventors: Takahito Tanimura, Kawasaki (JP); Takeshi Hoshida, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 710 days.

(21) Appl. No.: 15/367,589

(22) Filed: Dec. 2, 2016

(65) Prior Publication Data

US 2017/0161602 A1    Jun. 8, 2017

(30) Foreign Application Priority Data

Dec. 7, 2015    (JP) ................. 2015-238823

(51) Int. Cl.
*G06N 3/04* (2006.01)
*H04B 10/079* (2013.01)
(Continued)

(52) U.S. Cl.
CPC ............. *G06N 3/04* (2013.01); *G06N 3/08* (2013.01); *H04B 10/0773* (2013.01);
(Continued)

(58) Field of Classification Search
CPC .. G06N 3/04; G06N 3/08; G06N 3/02; G06N 3/067; G06N 3/0675; H04B 10/0773;
(Continued)

(56) References Cited

U.S. PATENT DOCUMENTS 5,251,204 A    10/1993 Izawa et al.
7,512,271 B2 *    3/2009 Matsugu ............ G06K 9/00281
                                                                        382/181
(Continued)

FOREIGN PATENT DOCUMENTS

JP    4-127743    4/1992
JP    7-129482    5/1995
JP    2013-191943    9/2013

OTHER PUBLICATIONS

C. Farabet, B. Martini, P. Akselrod, S. Talay, Y. LeCun and E. Culurciello, "Hardware accelerated convolutional neural networks for synthetic vision systems," Proceedings of 2010 IEEE International Symposium on Circuits and Systems, Paris, 2010, pp. 257-260. (Year: 2010).*

(Continued)

*Primary Examiner* — Kakali Chaki
*Assistant Examiner* — Vasyl Dykyy
(74) *Attorney, Agent, or Firm* — Staas & Halsey LLP (57) ABSTRACT

A data collecting device includes a receiver configured to receive an optical signal; an optical-to-electrical converter configured to convert the optical signal received by the receiver into an electrical signal; an analog-to-digital converter configured to convert the electrical signal into a digital signal; a data reducing circuit configured to reduce the digital signal output from the analog-to-digital converter; and a transmitter configured to transmit, to a managing device that manages the data collecting device, a signal obtained by reducing the digital signal by the data reducing circuit.

10 Claims, 8 Drawing Sheets

(51) Int. Cl.
  *H04B 10/27* (2013.01)
  *H04B 10/077* (2013.01)
  *G06N 3/08* (2006.01)
  *H04B 10/50* (2013.01)
  *H04B 10/60* (2013.01)
  *G06N 3/02* (2006.01)

(52) U.S. Cl.
  CPC ......... *H04B 10/0793* (2013.01); *H04B 10/27* (2013.01); *H04B 10/50* (2013.01); *H04B 10/60* (2013.01); *G06N 3/02* (2013.01)

(58) Field of Classification Search
  CPC .... H04B 10/0793; H04B 10/27; H04B 10/50; H04B 10/60
  See application file for complete search history.

(56) References Cited

U.S. PATENT DOCUMENTS

| | | | | |
|---|---|---|---|---|
| 2010/0046961 | A1* | 2/2010 | Tanimura | H03F 3/08 398/159 |
| 2012/0177368 | A1* | 7/2012 | Aoki | H04B 10/616 398/38 |
| 2015/0199105 | A1* | 7/2015 | Hansen | G06F 3/04815 715/851 |
| 2015/0281807 | A1* | 10/2015 | Pan | H04Q 9/00 340/870.02 |
| 2017/0039419 | A1* | 2/2017 | Shiiyama | G06K 9/00926 |
| 2017/0111871 | A1* | 4/2017 | Lee | H04B 1/00 |

OTHER PUBLICATIONS

Supakit Siripanadorn, Wipawee Hattagam, Neung Teaumroong, "Anomaly Detection in Wireless Sensor Networks using Self-Organizing Map and Wavelets", Selected topics in applied computer science, pp. 381-387. (Year: 2010).*

Yi Deng, Hua Lin, Arun G. Phadke, Sandeep Shukla, James S. Thorp, Laraine Mili, "Communication network modeling and simulation for wide area measurement applications", IEEE, Bradley Department of Electrical & Computer Engineering. (Year: 2011).*

Japanese Office Action dated Jun. 11, 2019 in corresponding Japanese Patent Application No. 2015-238823.

* cited by examiner

United States Patent US 10,853,719 B2

DATA COLLECTING DEVICE AND OPTICAL TRANSMISSION SYSTEM

CROSS-REFERENCE TO RELATED APPLICATION

This application is based upon and claims the benefit of priority of the prior Japanese Patent Application No. 2015-238823, filed on Dec. 7, 2015, the entire contents of which are incorporated herein by reference.

FIELD

The embodiment discussed herein is related to a data collecting device installed in an optical network and an optical transmission system.

BACKGROUND

It is expected that the automation of abnormality detection and an increase in the speed of the abnormality detection during an operation and upon the introduction of new equipment are achieved by accumulating and analyzing data collected by data collecting devices installed at multiple locations in an optical network. Traditionally, regarding an optical network, the reception power of a receiver has been transmitted to a managing device, and the managing device has analyzed signal interruption or analyzed the network using a relatively simple data collecting device and a small amount of data.

As a conventional technique for analyzing the state of a network, the following technique is known (for example, the technique described in Japanese Laid-open Patent Publication No. 4-127743). A broadband ISDN asynchronous transfer mode (ATM) exchange inserts test data in an ATM cell in accordance with a command from a central control unit of the ATM exchange and outputs the test cell after the insertion of the test data via an ATM switch included in the ATM exchange. The ATM exchange includes a test cell insertion checking unit that checks the test data returned from an ATM layer between the ATM switch and a synchronous optical network type transmission path or returned from a subscriber terminal adapter. Thus, the transmission path is tested online during an operation of the ATM exchange.

In addition, the following conventional technique is known (for example, the technique described in Japanese Laid-open Patent Publication No. 7-129482). A network is composed of a management target device having a mechanism for reflecting the results of management information diagnosis in a single representative management information item and a network management computer able to transmit and receive management information items to and from the management target device. By reducing a communication load and managing multiple management information items, the network is efficiently managed.

In recent years, optical networks have been requested to be analyzed in more detail so that the analysis includes the analysis of physical characteristics such as nonlinear characteristic states of the networks, for example. The analysis of only reception power of receivers is not sufficient. In order to analyze the networks in detail, raw data of optical electromagnetic fields that is collected by digital coherent receivers installed at multiple locations is to be collected.

The amount of data collected by each digital coherent receiver per second, however, is in a range of 100 gigabytes to several terabytes, and several hundreds of receivers may be c coupled to a single node. The total amount of collected data may exceed a communication capacity provided by a single node. It is, therefore, difficult to transmit all data collected by each of receivers of each of nodes to a remotely located central analyzing device in nearly real time in the aforementioned conventional techniques.

SUMMARY

According to an aspect of the embodiments, a data collecting device includes a receiver configured to receive an optical signal; an optical-to-electrical converter configured to convert the optical signal received by the receiver into an electrical signal; an analog-to-digital converter configured to convert the electrical signal into a digital signal; a data reducing circuit configured to reduce the digital signal output from the analog-to-digital converter; and a transmitter configured to transmit, to a managing device that manages the data collecting device, a signal obtained by reducing the digital signal by the data reducing circuit.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Figure 1:
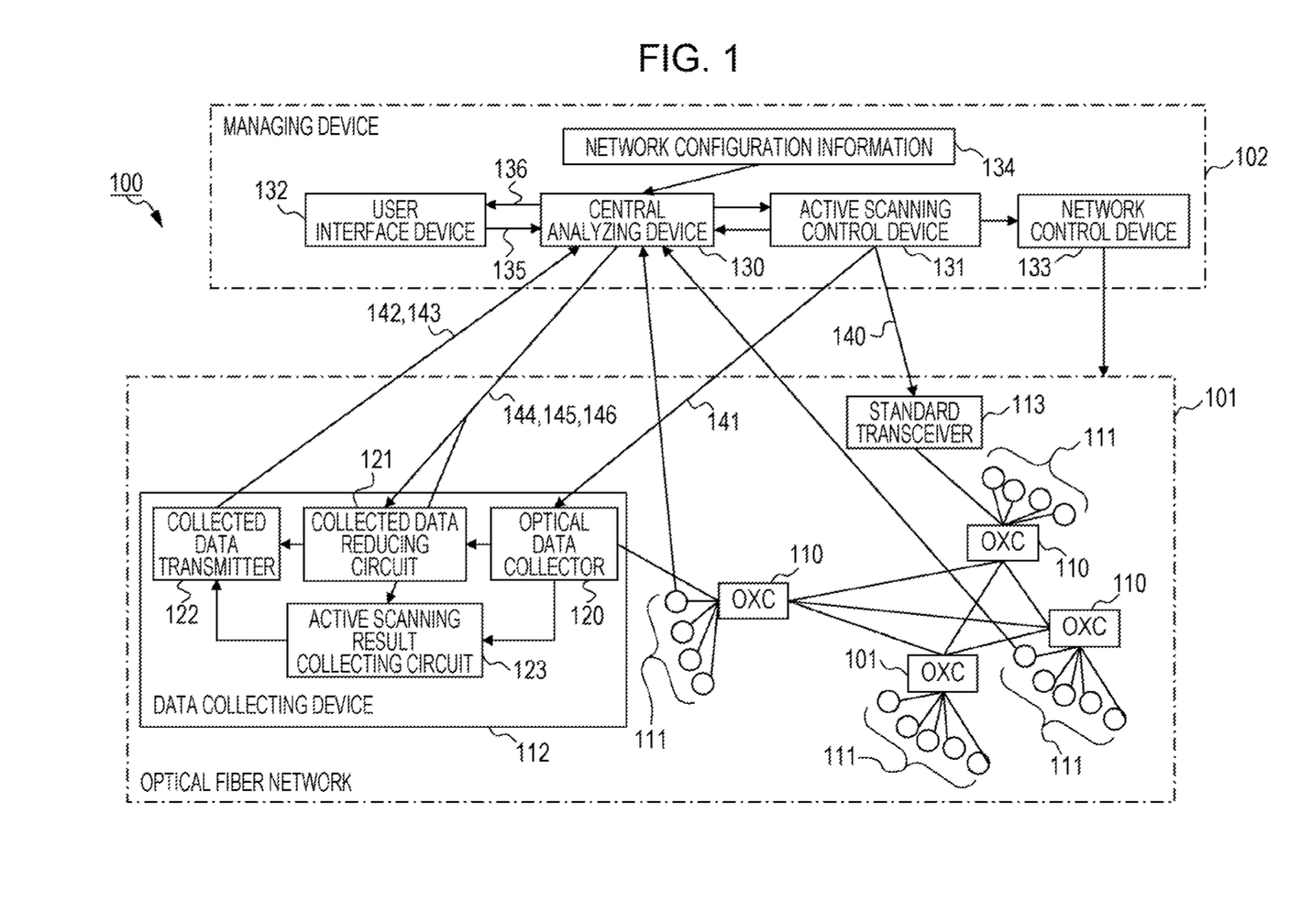
FIG. 1 is a diagram illustrating an exemplary configuration of an optical transmission system according to an embodiment.

Hereinafter, an embodiment is described in detail with reference to the accompanying drawings. FIG. 1 is a diagram illustrating an exemplary configuration of an optical transmission system 100 according to the embodiment. The optical transmission system 100 includes an optical network 101 and a managing device 102. In the optical network 101, multiple optical cross-connects (OXCs) 110 are connected to each other by optical fibers. The OXCs 110 are devices that freely switch optical communication paths for data transmission (switching). Even if data transmission paths that are in different forms for usage purposes and transmission rates exist, the OXCs 110 may output data signals to different paths. A method for conversion by the OXCs 110 is a method of converting optical signals into electrical signals in the OXCs 110 and reconverting the electrical signals into optical signals of another type, a method of converting optical signals into optical signals in another form, or the like.

Each of the OXCs 110 is connected to multiple digital coherent transceivers 111. Each digital coherent transceiver 111 executes an operation of converting an optical signal into an electrical signal (digital coherent receiver) and an operation of converting an electrical signal into an optical signal (digital coherent transmitter). In addition, each of the OXCs 110 is coupled to at least one data collecting device 112 as a special device belonging to digital coherent transceivers 111. An OXC 110, digital coherent transceivers 111 connected to the OXC 110, and a data collecting device 112 coupled to the OXC 110 form a single node.

Each of the data collecting devices 112 includes an optical data collector 120, a collected data reducing circuit 121, a collected data transmitter 122, and an active scanning result collecting circuit 123.

The optical data collector 120 receives an optical signal transmitted from an optical fiber connected to an OXC 110 and collects data (hereinafter referred to as "collected data").

The collected data reducing circuit 121 reduces the collected data without a loss of main information included in the optical signal that has carried the collected data or without a loss of, for example, nonlinear characteristics such as a polarization state. Then, the collected data reducing circuit 121 compares the reduced collected with normal data. If the collected data reducing circuit 121 determines that the reduced data is sufficiently close to the normal data, the collected data reducing circuit 121 discards the reduced data. On the other hand, if the collected data reducing circuit 121 determines that the reduced data is likely to be different from the normal data, the collected data reducing circuit 121 outputs, as an output signal, the reduced data 142 obtained by reducing the collected data. The characteristics of the reduction operation by the collected data reducing circuit 121 and the normal data are specified by a central analyzing device 130 included in the managing device 102 as a command 144 to specify the amount of characteristics to be extracted and a normal characteristic amount 146.

The active scanning result collecting circuit 123 operates if the optical data collector 120 determines, based on an active scanning state notification 141 from the managing device 102, that the collected data is active scanning data. The active scanning result collecting circuit 123 reduces the active scanning data collected by the optical data collector 120 without a loss of main information indicated in the active scanning data and outputs, as an output signal, detailed scanning data 143 obtained by reducing the active scanning data. The characteristics of the reduction operation by the active scanning result collecting circuit 123 are specified by the central analyzing device 130 included in the managing device 102 as a command 145 to specify the amount of characteristics to be extracted.

The collected data transmitter 122 transmits the reduced data 142 output by the collected data reducing circuit 121 or the detailed scanning data 143 to the central analyzing device 130 included in the managing device 102.

In the optical network 101, at least one standard transceiver 113 is included. If the managing device 102 detects that a certain node is likely to have a problem, the standard transceiver 113 executes active scanning based on an active scanning start or stop notification 140 from the managing device 102. Specifically, the standard transceiver 113 transmits active scanning data of specific patterns via a path extending through the certain node that is likely to have the problem, and the standard transceiver 113 receives the returned active scanning data. Normally, data to be transmitted is a still image, a video image, or the like, and the type of the data to be transmitted is not clear. The active scanning data of the specific patterns, however, is transmitted by the execution of the active scanning and it is determined whether or not the specific patterns were normally received by a data collecting device 112. The patterns of the active scanning data are an optical signal pattern with polarization only in a horizontal direction and an optical signal pattern with polarization only in a vertical direction, for example. An abnormality depending on polarization may be detected based on the optical signal patterns. Other various optical signal patterns may be specified.

The managing device 102 includes the central analyzing device 130, an active scanning control device 131, a user interface device 132, a network control device 133, and network configuration information 134 as a storage device. The managing device 102 has a configuration in which the aforementioned devices are installed in a single server computer and configured to communicate with each other in a network or distributed and installed in multiple server computers and configured to communicate with each other in the network.

The user interface device 132 receives an analysis option 135 input by an administrator and outputs the analysis option 135 to the central analyzing device 130. In addition, the user interface device 132 receives an analysis result, an alert, and action presentation 136 and displays the analysis result, the alert, and the action presentation 136 to the administrator.

The central analyzing device 130 transmits, to multiple data collecting devices 112 installed in the optical network 101 and recognized based on the network configuration information 134, the commands 144 and 145 to specify the amounts of characteristics to be extracted and the normal characteristic amount 146. The command 144 to specify the amount of characteristics to be extracted specifies the characteristics of the reduction operation by the collected data reducing circuits 121 included in the data collecting devices 112. The command 145 to specify the amount of characteristics to be extracted specifies the characteristics of the reduction operation by the active scanning result collecting circuits 123 included in the data collecting devices 112. The normal characteristic amount 146 is used for normal determination by the collected data reducing circuits 121 included in the data collecting devices 112. The central analyzing device 130 receives, from each of the aforementioned multiple data collecting devices 112, reduced data 142 or detailed scanning data 143 as collected data.

The central analyzing device 130 executes multidimensional data analysis on the collected data in accordance with the analysis option 135 specified by the user interface device 132.

The central analyzing device 130 may specify the commands 144 and 145 to specify the amounts of characteristics to be extracted and the normal characteristic amount 146 for the data collecting devices 112 included in the optical network 101 again.

The central analyzing device 130 may cause the active scanning control device 131 to transmit the active scanning start or stop notification 140 to the standard transceiver 113 included in the optical network 101 and may cause the standard transceiver 113 to execute the active scanning.

The central analyzing device 130 outputs, based on the result of the aforementioned multidimensional data analysis, the analysis result, an alert against the occurrence of a problem, and the presentation of an action to be taken next (hereinafter referred to as "analysis result, alert, and action presentation 136") to the user interface device 132.

If the configuration of the optical network 101 or the like is to be changed or the like, the central analyzing device 130 controls the OXCs 110 on the optical network 101 via the network control device 133 based on the result of the aforementioned multidimensional data analysis. By the execution of the control, a failed OXC 110 is disconnected, a detour path is set, or the like.

Figure 2:
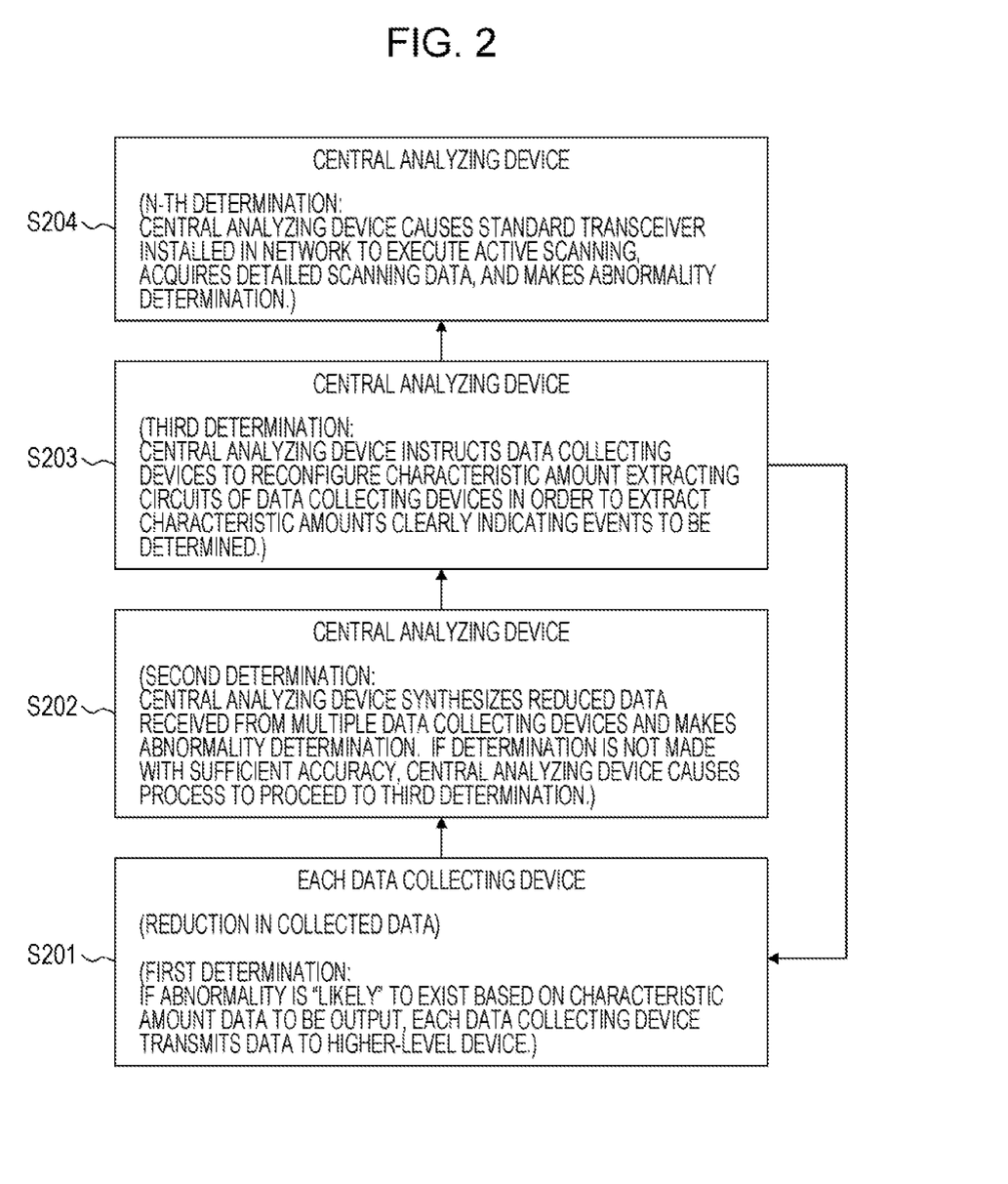
FIG. 2 is a flowchart of an example of whole operations of the optical transmission system according to the embodiment.

FIG. 2 is a flowchart of an example of whole operations of the optical transmission system 100 having the configuration illustrated in FIG. 1 according to the embodiment.

First, each of the data collecting devices 112 included in the optical network 101 executes the operation of reducing collected data based on the command 144 specified by the central analyzing device 130 and to be executed to specify the amount of characteristics to be extracted. Then, as first determination, each of the data collecting devices 112 compares characteristic amount data obtained by reducing collected data and to be output with the normal characteristic amount 146 specified by the central analyzing device 130 and thereby determines whether the obtained characteristic amount data to be output is normal or abnormal. If the obtained characteristic amount data to be output is likely to be abnormal, each of the data collecting devices 112 transmits, as reduced data 142, the characteristic amount data obtained by reducing the collected data to a higher-level device such as the central analyzing device 130 (in step S201 illustrated in FIG. 2). The reduced data 142 is transmitted directly to the central analyzing device 130 from each of the data collecting devices 112, but may be transmitted to the central analyzing device 130 via some data collecting devices 112, a relay device (not illustrated), or central analyzing devices (not illustrated) arranged at multiple stages.

As second determination, the central analyzing device 130 synthesizes the reduced data 142 transmitted from the multiple data collecting devices 112 included in the optical network 101, executes the multidimensional data analysis on the synthesized data, and determines whether the synthesized data is normal or abnormal. If the central analyzing device 130 obtains the result of the abnormality determination with sufficient accuracy, the central analyzing device 130 outputs the analysis result, alert, and action presentation 136 to the user interface device 132. On the other hand, if the central analyzing device 130 does not obtain the result of the abnormality determination with sufficient accuracy, the central analyzing device 130 causes a process to proceed to third determination (in step S202 illustrated in FIG. 2).

As the third determination, the central analyzing device 130 transmits a new command 144 to specify the amount of characteristics to be extracted and the normal characteristic amount 146 to each of the data collecting devices 112. Thus, the central analyzing device 130 instructs the data collecting devices 112 to reconfigure characteristic amount extracting circuits (described later) included in the data collecting devices 112 in order to extract the amounts of characteristics clearly indicating events to be determined (in step S203 illustrated in FIG. 2).

As a result, the central analyzing device 130 receives reduced data 142 from the data collecting devices 112 again and analyzes the received reduced data 142 (in a process of repeating step S203, S201, and S202 illustrated in FIG. 2).

If more detailed data is to be used as a result of the aforementioned process of repeating S203, S201, and S202, the central analyzing device 130 transmits the active scanning start or stop notification 140 to the standard transceiver 113 included in the optical network 101 via the active scanning control device 131. The standard transceiver 113 executes the active scanning based on the active scanning start or stop notification 140. The standard transceiver 113 transmits, based on the active scanning start or stop notification 140, active scanning data of specific patterns via a path extending through a node in which an abnormality is likely to exist, and the standard transceiver 113 receives the returned active scanning data. As a result, as N-th determination, the central analyzing device 130 acquires detailed scanning data 143 from a data collecting device 112 installed on the aforementioned path, executes the multidimensional data analysis on the acquired scanning data 143, and determines whether or not the acquired scanning data is abnormal (in step S204 illustrated in FIG. 2). The central analyzing device 130 outputs the result of the determination as the analysis result, alert, and action presentation 136 to the user interface device 132.

As described above, in the embodiment, the central analyzing device 130 specifies appropriate characteristics of the reduction operations for the data collecting devices 112 included in the optical network 101 based on operational stages. Thus, the amounts of data to be collected by the data collecting devices 112 serving as terminating devices of the optical network 101 may be reduced without a loss of main information such as nonlinear characteristics of the optical fibers.

Figure 3:
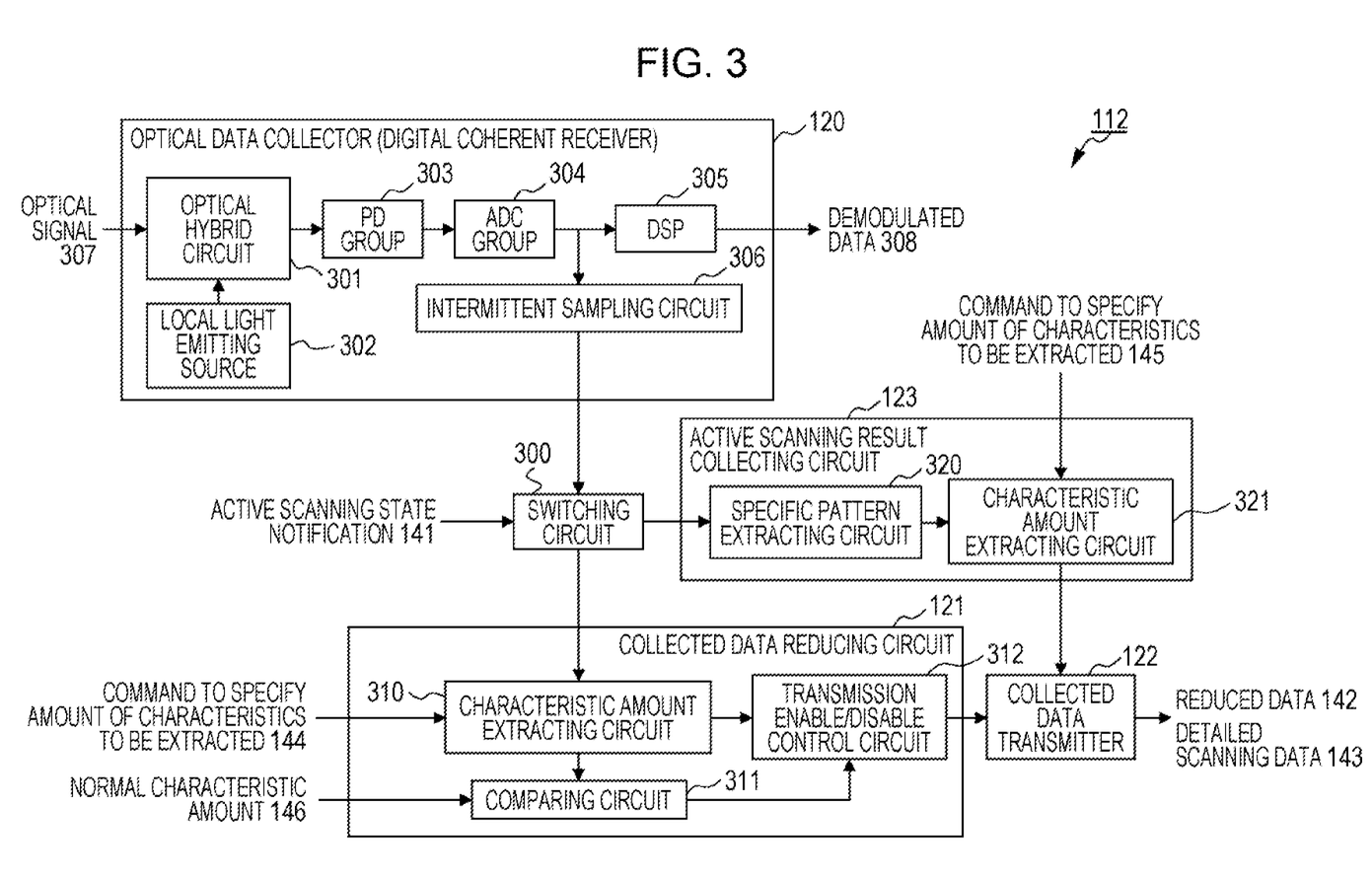
FIG. 3 is a block diagram illustrating an example of each of data collecting devices (digital coherent receivers with a collecting function)

FIG. 3 is a block diagram illustrating an example of each of the data collecting devices 112 illustrated in FIG. 1. The data collecting devices 112 are special devices for the digital coherent transceivers 111 illustrated in FIG. 1 and operate as digital coherent receivers having a collecting function. As illustrated in FIG. 1, each of the data collecting devices 112 includes the optical data collector 120, the collected data reducing circuit 121, the active scanning result collecting circuit 123, the collected data transmitter 122, and a switching circuit 300.

The optical collector 120 operates as a digital coherent receiver. The optical collector 120 includes an optical hybrid circuit 301, a local light emitting source 302, a PD group 303, an ADC group 304, a DSP 305, and an intermittent sampling circuit 306.

The optical hybrid circuit 301 causes an optical signal 307 input from an optical fiber connected to an OXC 110 illustrated in FIG. 1 to interfere with light emitted by the local light emitting source 302 and thereby separates an amplitude component of the optical signal into two polarized light components and separates a phase component of the optical signal into two polarized light components.

The PD group 303 is composed of four photodiodes (PDs) that receive the four polarized light components output by the optical hybrid circuit 301, convert the polarized light components into analog electrical signals, and output the analog electrical signals.

The ADC group 304 is composed of four analog-to-digital converters (ADCs) that receive the analog electrical signals output from the PDs included in the PD group 303, convert the analog electrical signals into digital signals, and output the digital signals.

The DSP 305 is a digital signal processor and receives the digital signals output from the ADCs included in the ADC group 304, demodulates the digital signals, and outputs demodulated data 308 that is the demodulated digital signals.

The intermittent sampling circuit 306 intermittently samples the digital signals output from the from the ADCs included in the ADC group 304 at predetermined sampling intervals and outputs collected data obtained by sampling the digital signals.

The switching circuit 300 assigns the collected data output from the intermittent sampling circuit 306 included in the optical data collector 120 to the collected data reducing circuit 121 and the active scanning result collecting circuit 123. When the central analyzing device 130 causes the standard transceiver 113 to execute the active scanning via the active scanning control device 131, the switching circuit 300 outputs an active scanning state notification 141 indicating that the active scanning is ON, as illustrated in FIG. 1. If the aforementioned active scanning state notification 141 indicates that the active scanning is ON, the switching circuit 300 transfers the collected data output from the intermittent sampling circuit 306 to the active scanning result collecting circuit 123. If the aforementioned active scanning state notification 141 does not indicate that the active scanning is ON, the switching circuit 300 transfers the collected data output from the intermittent sampling circuit 306 to the collected data reducing circuit 121.

The collected data reducing circuit 121 includes a characteristic amount extracting circuit 310, a comparing circuit 311, and a transmission enable/disable control circuit 312.

The characteristic amount extracting circuit 310 reduces the collected data received from the optical data collector 120 via the switching circuit 300 and outputs characteristic amount data indicating main information included in the optical signal 307 or indicating, for example, nonlinear characteristics such as a polarization state. The characteristics of the reduction operation by the characteristic amount extracting circuit 310 are specified by the central analyzing device 130 included in the managing device 102 illustrated in FIG. 1 as the command 144 to specify the amount of characteristics to be extracted.

The comparing circuit 311 compares the characteristic amount data output by the characteristic amount extracting circuit 310 with the normal characteristic amount received as the normal characteristic amount 146 from the central analyzing device 130 included in the managing device 102 illustrated in FIG. 1.

If the comparing circuit 311 determines that the characteristic amount data output by the characteristic amount extracting circuit 310 is normal, the transmission enable/disable control circuit 312 discards the characteristic amount data output by the characteristic amount extracting circuit 310. On the other hand, if the comparing circuit 311 determines that the characteristic amount data output by the characteristic amount extracting circuit 310 is abnormal, the transmission enable/disable control circuit 312 outputs, as reduced data 142 (output signal), the characteristic amount data output by the characteristic amount extracting circuit 310 to the collected data transmitter 122.

The active scanning result collecting circuit 123 includes a specific pattern extracting circuit 320 and a characteristic amount extracting circuit 321.

The specific pattern extracting circuit 320 extracts, from the collected data received from the optical data collector 120 via the switching circuit 300, a specific pattern region in which specific patterns are stored. The characteristic amount extracting circuit 321 receives data output by the specific pattern extracting circuit 320 and indicating the specific pattern region, reduces the received data indicating the specific pattern region, and outputs characteristic amount data indicating characteristics of the optical signal patterns, output by the standard transceiver 113 illustrated in FIG. 1, of the active scanning. In this case, the characteristic amount extracting circuit 321 outputs the characteristic amount data as detailed scanning data 143 to the collected data transmitter 122.

The collected data transmitter 122 transmits, to the central analyzing device 130 included in the managing device 102 illustrated in FIG. 1, the reduced data 142 output by the collected data reducing circuit 121 or the detailed scanning data 143 output by the active scanning result collecting circuit 123.

Figure 4:
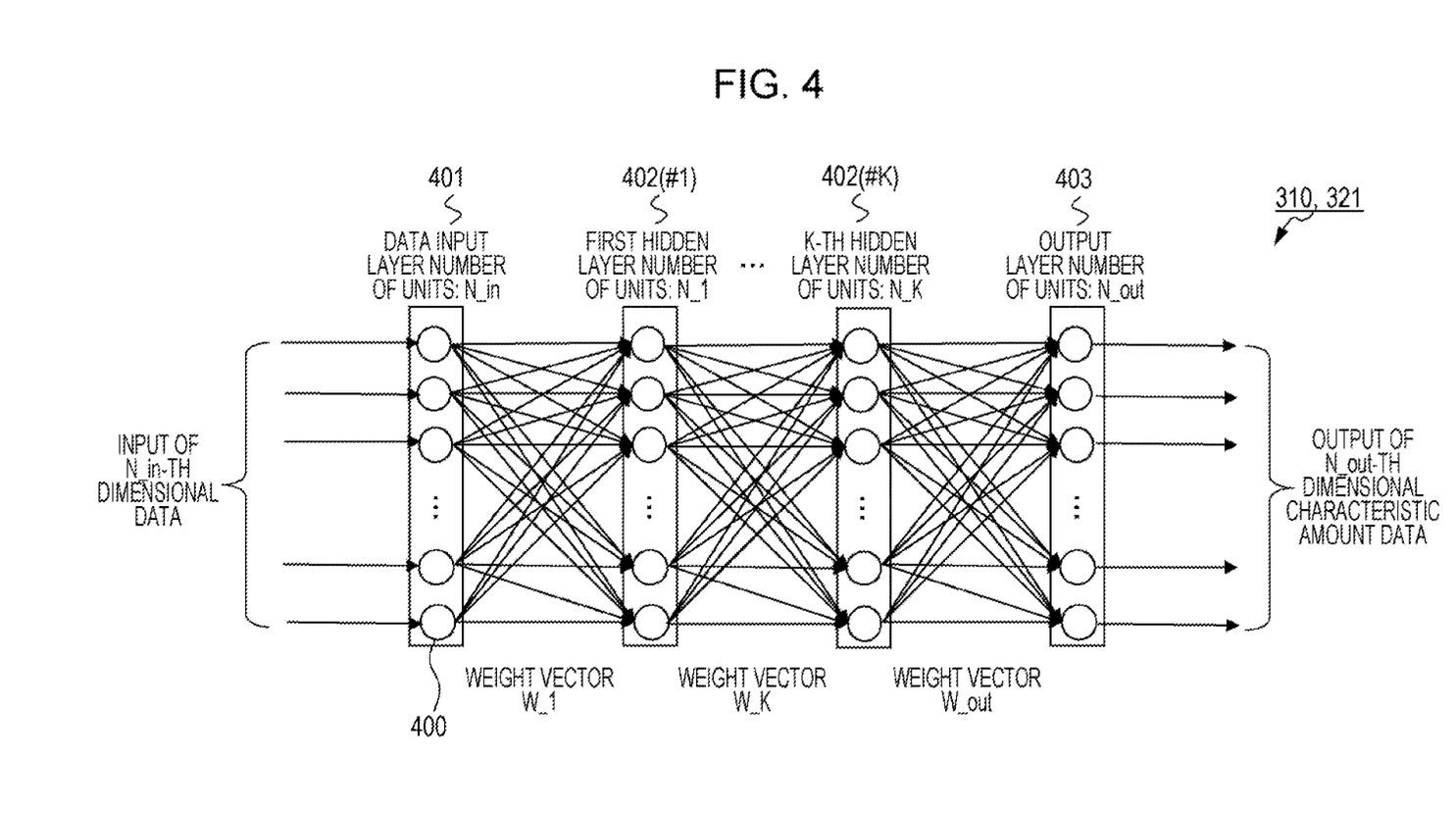
FIG. 4 is a block diagram illustrating an example of each of characteristic amount extracting circuits.

FIG. 4 is a block diagram illustrating an example of each of the characteristic amount extracting circuits 310 and 321. Referring to FIG. 4, each of the characteristic amount extracting circuits 310 and 321 has a data input layer 401, a number K of hidden layers 402(#1) to 402(# K), and an output layer 403 that are connected to each other in cascade. Each of these layers has multiple multi-input single-output units 400 indicated by circles in FIG. 4.

N_in-th dimensional data composed of a number N_in of data groups is input to a number N_in of input to multi-input single-output units 400 of the data input layer 401. A number N_in of collected data items are input from the intermittent sampling circuit 306 via the switching circuit 300 to the characteristic amount extracting circuit 310 illustrated in FIG. 3. Data portions of a number N_in of specific patterns are input from the specific pattern extracting circuit 320 to the characteristic amount extracting circuit 321 illustrated in FIG. 3. The number N_in of multi-input single-output units 400 of the data input layer 401 substitute input values into a predetermined activation function, for example, a known function such as a sigmoid function, an ReLU function, or a Maxout function, calculate values to be output from the input values by calculating the predetermined activation function, and output the calculated values.

The values output from the multi-input single-output units 400 of the data input layer 401 are input to a number N_1 of multi-input single-output units 400 of the first hidden layer 402(#1) arranged at the next stage. The multi-input single-output units 400 may include a circuit or a processor. Each of the multi-input single-output units 400 of the first hidden layer 402(#1) multiplies the values output from the multi-input single-output units 400 of the data input layer 401 by coupling weight functions and sums the results of the multiplication. In addition, each of the multi-input single-output units 400 of the first hidden layer 402(#1) substitutes an input value obtained by summing the results of the multiplication into the aforementioned predetermined activation function, calculates a value to be output from the input value by calculating the predetermined activation function, and outputs the calculated value.

The values output from the multi-input single-output units 400 of the first hidden layer 402(#1) are input to a number N_2 of multi-input single-output units 400 of the second hidden layer 402(#2) arranged at the next stage. Each of the multi-input single-output units 400 of the second hidden layer 402(#2) multiplies the values output from the multi-input single-output units 400 of the first hidden layer 402(#1) by coupling weight coefficients and sums the results of the multiplication. In addition, each of the multi-input single-output units 400 of the second hidden layer 402(#2) substitutes an input value obtained by summing the results of the multiplication into the aforementioned predetermined activation function, calculates a value to be output from the input value by calculating the predetermined activation function, and outputs the calculated value.

Similarly, values output from multi-input single-output units 400 of an i−1-th hidden layer 402(# i−1) are input to a number N_i of multi-input single-output units 400 of an i-th hidden layer 402(# i) arranged at the next stage. In this case, 2≤i≤K. Each of the multi-input single-output units 400 of the i-th hidden layer 402(# i) multiplies the values output from the multi-input single-output units 400 of the i−1-th hidden layer 402(# i−1) by coupling weight coefficients and sums the results of the multiplication. In addition, each of the multi-input single-output units 400 of the i-th hidden layer 402(# i) substitutes an input value obtained by summing the results of the multiplication into the aforementioned predetermined activation function, calculates a value to be output from the input value by calculating the predetermined activation function, and outputs the calculated value.

Values output from multi-input single-output units 400 of a K-th hidden layer 402(# K) arranged at the last stage are input to a number N_out of multi-input single-output units 400 of the output layer 403 arranged at the next stage. Each of the multi-input single-output units 400 of the output layer 403 multiplies the values output from the multi-input single-output units 400 of the K-th hidden layer 402(# K) by coupling weight coefficients and sums the results of the multiplication. In addition, each of the multi-input single-output units 400 of the output layer 403 substitutes an input value obtained by summing the results of the multiplication into the aforementioned predetermined activation function, calculates a value to be output from the input value by calculating the predetermined activation function, and outputs the calculated value. In this case, a number N_out of values are output as N_out-th dimensional characteristic amount data including the values as element values. In other words, the number N_in of input collected data items are mapped by the characteristic amount extracting circuit 310 to the characteristic amount data to be output.

Figure 5:
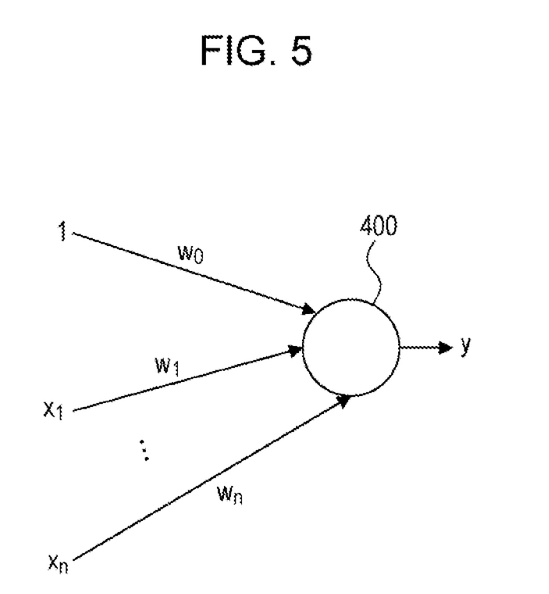
FIG. 5 is a diagram illustrating an exemplary configuration of each of multi-input single-output units.

FIG. 5 is a diagram illustrating an exemplary configuration of each of the multi-input single-output units 400. FIG. 5 assumes that the number of multi-input single-output units 400 of a layer arranged at the previous stage of a target layer is n and that values output from the multi-input single-output units 400 of the layer arranged at the previous stage are $x_1$, $x_2$, ..., $x_n$. In addition, FIG. 5 assumes that coupling weight coefficients by which the output values $x_1$, $x_2$, ..., $x_n$ are multiplied are $w_1$, $w_2$ ... $w_n$. Furthermore, FIG. 5 assumes that a coupling weight coefficient by which a fixed value 1 is multiplied is $w_0$. A value y to be output from a target multi-input single-output unit 400 included in the target layer is calculated according to the following equation.

$$y = f\left(\sum_{k=1}^{n} w_k x_k + w_0\right) \quad (1)$$

In Equation 1, f( ) indicates the calculation of the aforementioned activation function. In the embodiment, the coupling weight coefficients $w_1$, $w_2$, ..., $w_n$ of a number N_i of multi-input single-output units 400 of the target layer i (1≤i≤K or i=out) are given as a weight vector W_i. A weight vector W_i for each of the layers is given by the central analyzing device 130 illustrated in FIG. 1 as the command 144 or 145 to specify the amount of characteristics to be extracted.

As illustrated in FIGS. 4 and 5, each of the characteristic amount extracting circuits 310 and 321 illustrated in FIG. 3 has a neural network configuration. In this case, each of the characteristic amount extracting circuits 310 and 321 is designed so that N_in >N_out and that N_i (1≤i≤K) is set to an appropriate number of units. The central analyzing device 130 included in the managing device 102 illustrated in FIG. 1 uses training data of combinations of N_in-th dimensional input data corresponding to the normal and abnormal states and N_out-th dimensional output data corresponding to the normal and abnormal states to execute machine learning on coupling weight coefficients used in the configurations illustrated in FIGS. 4 and 5.

As the N_in-th dimensional data input to the characteristic amount extracting circuit 310, a number N_in of collected data items corresponding to each of the normal and abnormal states are used. In addition, as the N_in-th dimensional data input to the characteristic amount extracting circuit 321, optical signal patterns of a number N_in of active scanning data items corresponding to each of the normal and abnormal states are used. The data corresponding to the normal and abnormal states is generated using a transmission simulator that simulates the optical network 101 illustrated in FIG. 1, for example.

A combination of coupling weight coefficients obtained by the machine learning and to be provided for each of the characteristic amount extracting circuits 310 and 321 is provided, as the command 144 or 145 to specify the amount of characteristics to be extracted, from the central analyzing device 130 to the characteristic amount extracting circuit 310 or 321 included in the data collecting device 112. As a result, the characteristic amount extracting circuit 310 operates so that, when receiving collected data corresponding to the normal state, the characteristic amount extracting circuit 310 outputs characteristic amount data corresponding to the normal state and that, when receiving collected data corresponding to the abnormal state, the characteristic amount extracting circuit 310 outputs characteristic amount data corresponding to the abnormal state. Similarly, the characteristic amount extracting circuit 321 operates and outputs characteristic amount data obtained by the active scanning and clearly distinguished between characteristic amount data corresponding to the normal state and characteristic amount data corresponding to the abnormal state. In the characteristic amount extracting circuit 310 or 321, the number N_out of dimensions of characteristic amount data to be output may be much smaller than the number N_in of dimensions of input data, as known as a dimension reduction process to be executed in a deep learning process. Thus, the data reduction may be executed at the first stage on the data collected to analyze the network.

Since the comparing circuit 311 compares the characteristic amount data output by the characteristic amount extracting circuit 310 with the normal characteristic amount data output as the normal characteristic amount 146, the collected data reducing circuit 121 illustrated in FIG. 3 may output, as the reduced data 142, only characteristic amount data corresponding to the abnormal state. Thus, the data reduction may be executed at the second stage. Since the amount of continuously input collected data is large, the aforementioned data reduction may be executed at the first and second stages. Thus, the amount of data transmitted by the data collecting devices 112 to the central analyzing device 130 and to be used for analysis may be greatly reduced.

Since the active scanning is executed only in specific time periods, the characteristic extracting circuit 321 may transmit, as detailed scanning data 143, characteristic amount data for the active scanning to the central analyzing device 130 without changing the characteristic amount data.

Figure 6:
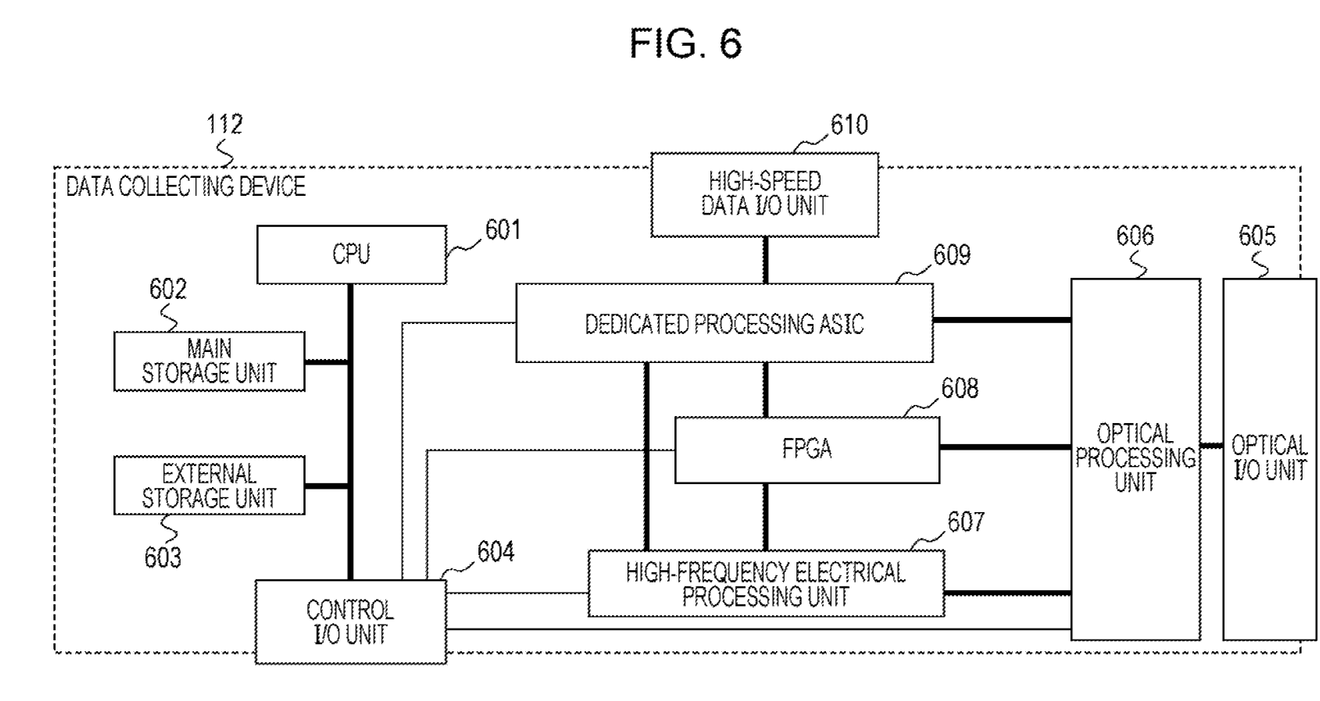
FIG. 6 is a block diagram illustrating an exemplary hardware configuration of each of the data collecting devices.

FIG. 6 is a block diagram illustrating an exemplary hardware configuration of each of the data collecting devices 112 illustrated in FIG. 1. Each of the data collecting devices 112 includes a CPU 601, a main storage unit 602, an external storage unit 603, a control input and output (I/O) unit 604, an optical I/O unit 605, an optical processing unit 606, a high-frequency electrical processing unit 607, an FPGA 608, a dedicated processing ASIC 609, and a high-speed data I/O unit 610.

The optical I/O unit 605 terminates an optical fiber. The optical processing unit 606 includes the optical hybrid circuit 301, the local light emitting source 302, and the PD group 303 that are included in the optical data collector 120 illustrated in FIG. 3 and are mounted as hardware.

The dedicated processing ASIC 609 includes the ADC group 304 and the DSP 305 that are mounted as hardware of the application specific integrated circuit (ASIC) and illustrated in FIG. 3. The dedicated processing ASIC 609 uses four ADC blocks to receive analog electrical signals output from four PDs included in the optical processing unit 606 and convert the received analog electrical signals into digital signals. Then, the dedicated processing ASIC 609 demodulates the digital signals output from the ADC blocks and outputs demodulated data (corresponding to 308 illustrated in FIG. 3) that is the demodulated digital signals.

The demodulated data is output to an external data processing device (not illustrated) via the high-speed data I/O unit 610.

The FPGA 608 includes the intermittent sampling circuit 306, the switching circuit 300, the collected data reducing circuit 121, and the active scanning result collecting circuit 123 that are mounted as hardware of the field programmable gate array and illustrated in FIG. 3. Specifically, the FPGA 608 includes the characteristic amount extracting circuits 310 and 321 included in the collected data reducing circuit 121 and the active scanning result collecting circuit 123 and mounted as hardware of a common single characteristic amount extracting circuit. In addition, the FPGA 608 includes the comparing circuit 311 and the transmission enable/disable control circuit 312 that are included in the collected data reducing circuit 121 and mounted as hardware. Furthermore, the FPGA 608 includes the specific pattern extracting circuit 320 included in the active scanning result collecting circuit 123 and mounted as hardware.

The high-frequency electrical processing unit 607 supplies a clock signal or the like to the optical processing unit 606, the dedicated processing ASIC 609, the FPGA 608, and the control I/O unit 604.

The CPU 601, the main storage unit 602, the external storage unit 603, and the control I/O unit 604 are connected to each other by a bus. The CPU 601 executes a control program loaded in the main storage unit 602 and thereby controls the dedicated processing ASIC 609 and the FPGA 608 via the control I/O unit 604. The external storage unit 603 stores data (log data and the like) of various types that is to be stored for a long time period.

Figure 7:
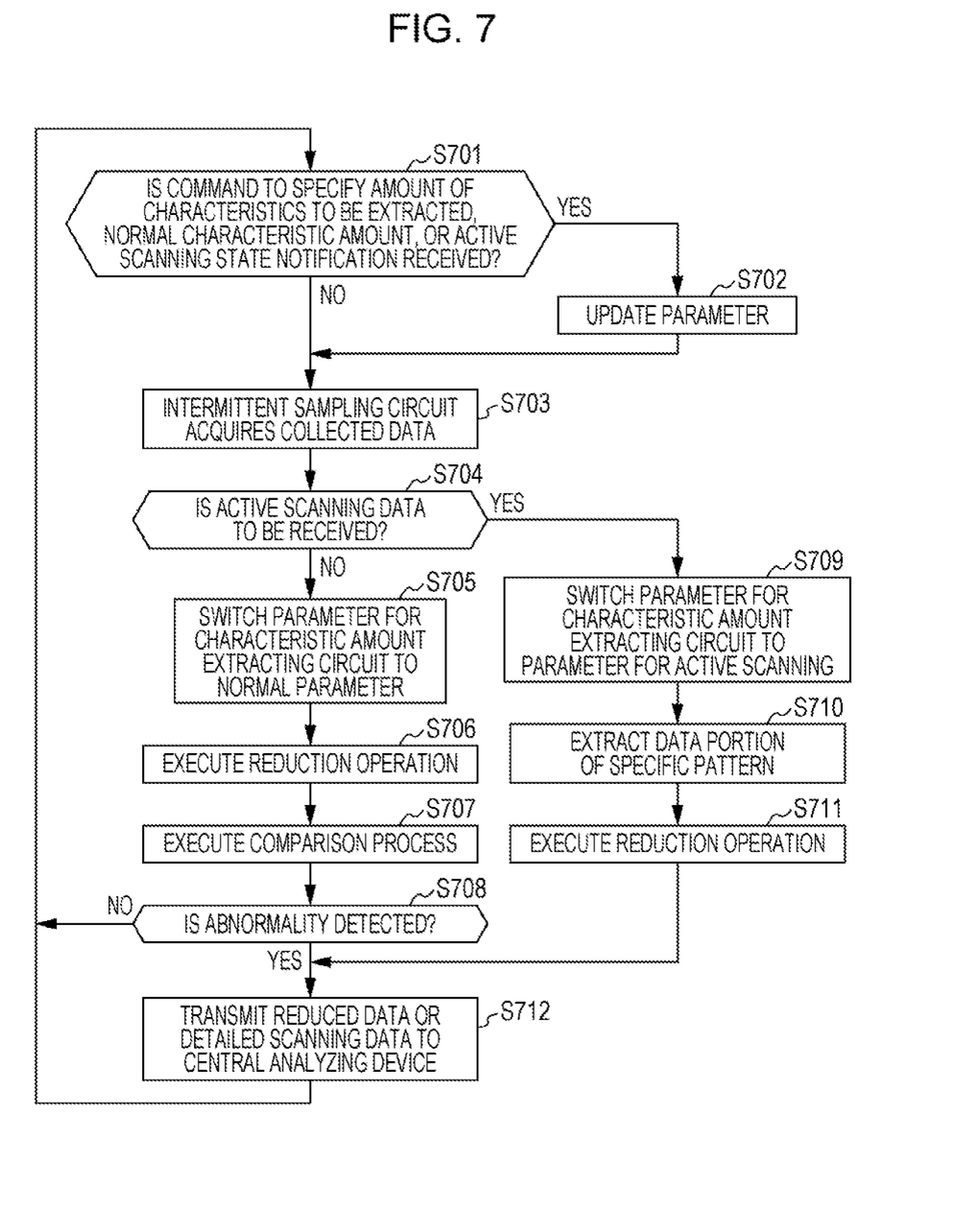
FIG. 7 is a flowchart of an example of a process to be executed by each of the data collecting devices.

FIG. 7 is a flowchart of an example of a process to be executed by each of the data collecting devices 112 having the hardware configuration illustrated in FIG. 6. Hereinafter, the process is described with reference to the configuration illustrated in FIG. 6.

First, the CPU 601 determines whether or not the data collecting device 112 received control data such as the command 144 to specify the amount of characteristics to be extracted, the command 145 to specify the amount of characteristics to be extracted, the normal characteristic amount 146, the active scanning state notification 141, or the like from the central analyzing device 130 illustrated in FIG. 1 via the control I/O unit 604 (in step S701).

If the answer to the determination of step S701 is YES, the CPU 601 updates a parameter stored in the FPGA 608 via the control I/O unit 604 and provided for coupling weight coefficients for the characteristic amount extracting circuit 310, a parameter stored in the FPGA 608 via the control I/O unit 604 and provided for coupling weight coefficients for the characteristic amount extracting circuit 321, or a parameter for the normal characteristic amount data to be used by the comparing circuit 311 (in step S702). If the answer to the determination of step S701 is NO, the process of step S702 is skipped.

Then, the intermittent sampling circuit 306 (illustrated in FIG. 3) mounted in the FPGA 608 acquires collected data (in step S703).

The switching circuit 300 (illustrated in FIG. 3) mounted in the FPGA 608 determines whether or not the switching circuit 300 was instructed to receive active scanning data (in step S704). Specifically, the switching circuit 300 determines whether or not the active scanning state notification 141 that indicates that the active scanning is ON is already set in the FPGA 608 from the central analyzing device 130 illustrated in FIG. 1.

If the active scanning state notification 141 that indicates that the active scanning is ON is not set (NO in step S704), the following operation is executed.

First, the characteristic amount extracting circuit (with the common configuration corresponding to the characteristic amount extracting circuits 310 and 321 illustrated in FIG. 3) mounted in the FPGA 608 and having the neural network configuration illustrated in FIG. 4 switches the parameter to a normal parameter (in step S705). Specifically, the characteristic amount extracting circuit switches the parameter for the coupling weight coefficients provided for the characteristic amount extracting circuit to the normal parameter provided for the characteristic amount extracting circuit 310 (illustrated in FIG. 3) and set in the FPGA 608 in accordance with the command 144 to specify the amount of characteristics to be extracted in step S702. If the parameter is already switched, the process of step S705 may be skipped.

Subsequently, the aforementioned characteristic amount extracting circuit (corresponding to the characteristic amount extracting circuit 310) included in the FPGA 608 executes the reduction operation (described with reference to FIG. 4) on the collected data acquired as input data in step S703 (in step S706).

Subsequently, the comparing circuit 311 mounted in the FPGA 608 executes the process of comparing the characteristic amount data output from the characteristic amount extracting circuit in S706 with the normal characteristic amount data (in step S707). The comparing circuit 311 uses, as the normal characteristic amount data, the normal characteristic amount 146 set in the FPGA 608 in step S702.

The transmission enable/disable control circuit 312 mounted in the FPGA 608 determines, as a result of the comparison process executed in step S707, whether or not an abnormality was detected (in step S708).

If the abnormality was not detected (NO in step S708), the transmission enable/disable control circuit 312 discards the characteristic amount data output from the characteristic amount extracting circuit in step S706 and causes the process to return to step S701.

If the abnormality was detected (YES in step S708), the transmission enable/disable control circuit 312 outputs, as the reduced data 142 (refer to FIG. 3), the characteristic amount data output from the characteristic amount extracting circuit in step S706 to the main storage unit 602 via the control I/O unit 604. In this case, the destination of the characteristic amount data may be the external storage unit 603, instead of the main storage unit 602.

If the active scanning state notification 141 that indicates that the active scanning is ON is already set in the FPGA 608 and the answer to the aforementioned determination of the step S704 is YES, the switching circuit 300 mounted in the FPGA 608 executes the following operation.

First, the characteristic amount extracting circuit (with the common configuration corresponding to 310 and 321 illustrated in FIG. 3) mounted in the FPGA 608 and having the neural network configuration illustrated in FIG. 4 switches the parameter to a parameter for the active scanning (in step S709). Specifically, the characteristic amount extracting circuit switches the parameter for the coupling weight coefficients provided for the characteristic amount extracting circuit to the parameter provided for the characteristic amount extracting circuit 321 (illustrated in FIG. 3) and set in the FPGA 608 in accordance with the command 145 to specify the amount of characteristics to be extracted in step S702. If the parameter is already switched, the process of step S709 may be skipped.

Subsequently, the specific pattern extracting circuit 320 (illustrated in FIG. 3) mounted in the FPGA 608 extracts a data portion (region) of specific patterns from the collected data acquired in step S703 (in step S710).

Then, the aforementioned characteristic amount extracting circuit (corresponding to the characteristic amount extracting circuit 321) mounted in the FPGA 608 executes the reduction operation (described with reference to FIG. 4) on the data portion, extracted in step S710, of the specific patterns as input data (in step S711). The characteristic amount extracting circuit outputs, as the detailed scanning data 143 (refer to FIG. 3), characteristic amount data obtained by reducing the data portion to the main storage unit 602 via the control I/O unit 604. In this case, the destination of the characteristic amount data may be the external storage unit 603, instead of the main storage unit 602.

When the reduced data 142 or the detailed scanning data 143 is transferred to the main storage unit 602 (or the external storage unit 603), the CPU 601 transmits the reduced data 142 or the detailed scanning data 143 to the central analyzing device 130 (in step S712). After that, the CPU 601 causes the process to return to the process of step S701.

Figure 8:
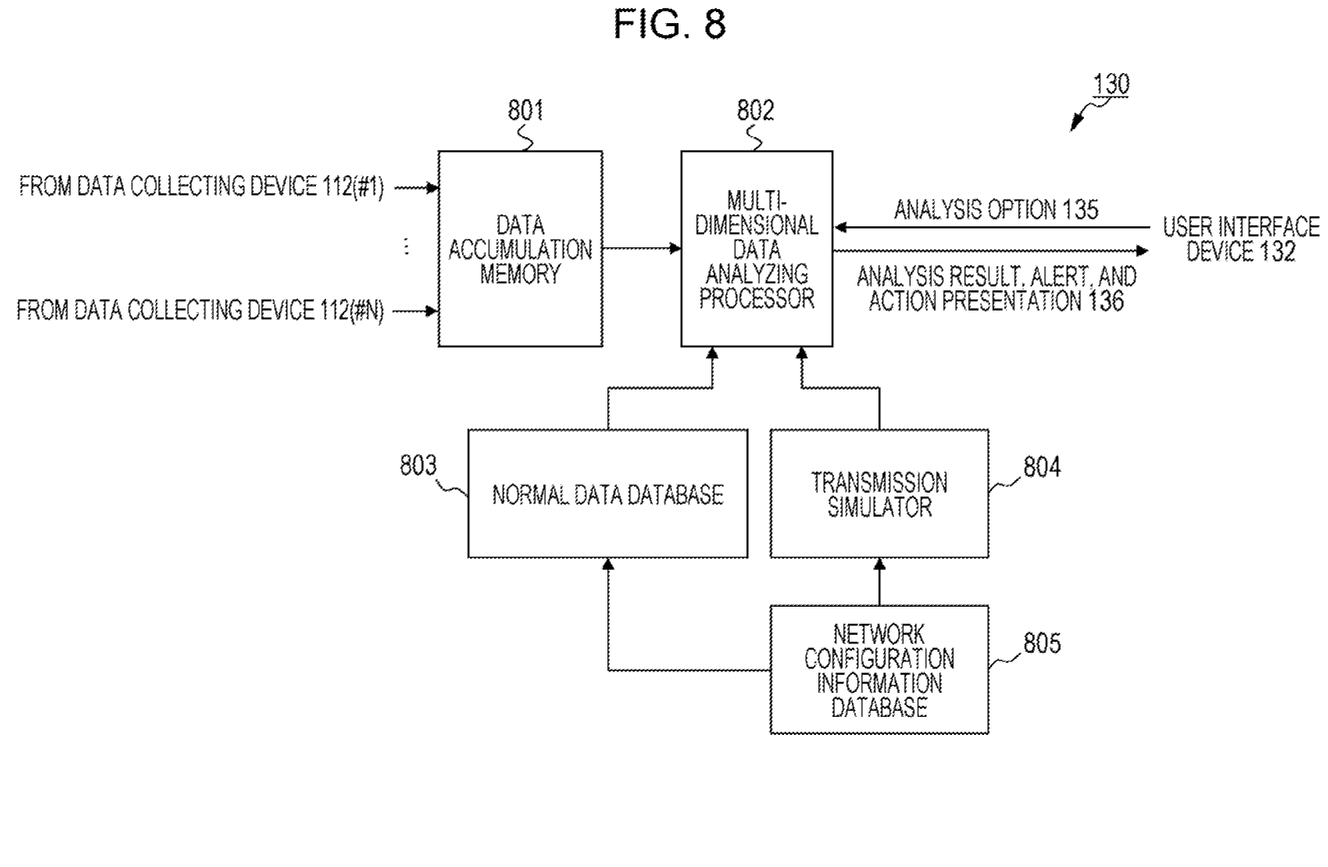
FIG. 8 is a block diagram illustrating an example of a central analyzing device.

FIG. 8 is a block diagram illustrating an example of the central analyzing device 130 illustrated in FIG. 1. The central analyzing device 130 includes a data accumulation memory 801, a multidimensional data analyzing processor 802, a normal data database 803, the transmission simulator 804, and a network configuration information database 805.

The data accumulation memory 801 accumulates the reduced data 142 or detailed scanning data 143 transmitted from the number N of data collecting devices 112 included in the optical network 101 illustrated in FIG. 1.

The multidimensional data analyzing processor 802 executes the multidimensional data analysis on the reduced data 142 accumulated in the data accumulation memory 801 or the detailed scanning data 143 accumulated in the data accumulation memory 801 in accordance with the analysis option 135 specified by the user interface device 132 illustrated in FIG. 1. In this case, the multidimensional data analyzing processor 802 references normal data accumulated in the normal data database 803 and determines whether or not the network is abnormal. In addition, the multidimensional data analyzing processor 802 references normal data received via the transmission simulator 804 simulating the optical network 101 and determines whether or not the network is abnormal. The multidimensional data analyzing processor 802 references the network configuration information database 805 and thereby determines association relationships between the normal data accumulated in the normal data database 803 or the normal data handled by the transmission simulator 804 and the optical network 101 illustrated in FIG. 1.

The multidimensional data analyzing processor 802 outputs, to the user interface device 132 illustrated in FIG. 1, the analysis result, alert, and action presentation 136 indicating the result of the multidimensional data analysis process, an alert against an abnormality of the network or the like, an action to be taken next, and the like and displays the analysis result, alert, and action presentation 136 to the administrator.

As a method for the multidimensional data analysis process to be executed by the multidimensional data analyzing processor 802, a general machine learning method such as a support vector machine (SVM), the k-means method, or the Random Forest method may be used, for example.

The aforementioned embodiment describes, as the detailed configurations of the characteristic amount extracting circuits 310 and 321 illustrated in FIG. 3, the neural network including the data input layer 401, the hidden layers 402, and the output layer 403 and illustrated in FIG. 4. In addition, as examples of the reduction operations to be executed by the characteristic amount extracting circuits 310 and 321 without a loss of main information included in transmitted optical signals, for example, a loss of nonlinear characteristics such as polarization states, the following methods for the reduction operations may be used. For example, the methods are principal component analysis (PCA) and independent component analysis (ICA).

The aforementioned embodiment exemplifies the data reduction to be executed at one stage and the single central analyzing device 130. However, a group of intermediate central analyzing devices may be provided in the optical network 101, and the data reduction may be executed at multiple stages.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A data collecting device comprising:
    a receiver configured to receive an optical signal;
    an optical-to-electrical converter configured to convert the optical signal received by the receiver into an electrical signal;
    an analog-to-digital converter configured to convert the electrical signal into a digital signal;
    a data reducing circuit having a neural network configured to map the digital signal to output-characteristic-amount data, the data reducing circuit configured to reduce the digital signal output from the analog-to-digital converter by discarding any of the output-characteristic-amount data within a predefined amount of normal-characteristic-amount data representing normal transmission of data through an optical network, and including a first characteristic-amount extracting circuit having a first reconfigurable-layered configuration with a first input layer, a first output layer including a first number of multi-input single-output units smaller than a second number of multi-input single-output units included in the first input layer, and a first hidden layer provided between the first input layer and the first output layer, the first hidden layer configured to map the digital signal output by the analog-to-digital converter to the output-characteristic-amount data provided for analysis and output, based on results of executing first machine learning on first coupling weight coefficients between the first input and first output layers; and a transmitter configured to transmit, to a managing device that manages the data collecting device, a signal obtained by reducing the digital signal by the data reducing circuit.

2. The data collecting device according to claim 1, wherein the data reducing circuit further includes
a comparing circuit configured to compare the output-characteristic-amount data output by the first characteristic-amount extracting circuit with the normal-characteristic-amount data, and
a transmission-enable/disable control circuit configured to discard the output-characteristic-amount data when the comparing circuit determines that the output-characteristic-amount data is within the predefined amount of the normal-characteristic-amount data and transmit the output-characteristic-amount data to the managing device via the transmitter as the signal obtained by the reduction when the output-characteristic-amount data is expected to be different from the normal-characteristic-amount data.

3. The data collecting device according to claim 2, wherein the first characteristic-amount extracting circuit includes a layered neural network.

4. The data collecting device according to claim 1, further comprising:
an active-scanning-result collecting circuit including a specific-pattern extracting circuit configured to extract, from an input signal, a specific-pattern region in which specific patterns for active scanning are stored and a second characteristic-amount extracting circuit configured to reduce data indicating the specific-pattern region and output by the specific-pattern extracting circuit and transmit, as the signal obtained by the reduction, a signal obtained by reducing the data via the transmitter; and
a switching circuit configured to switch, based on an active-scanning-state notification from the managing device, whether the signal output by the analog-to-digital converter is transferred to the data reducing circuit or transferred as the input signal to the specific-pattern extracting circuit.

5. The data collecting device according to claim 4, wherein the second characteristic-amount extracting circuit has a second reconfigurable-layered configuration and includes a second input layer, a second output layer including a smaller third number of multi-input single-output units smaller than a fourth number of multi-input single-output units included in the second input layer, and a second hidden layer provided between the second input layer and the second output layer and is configured to map the data indicating the specific-pattern region to characteristic-amount data provided for analysis, active scanning and output, based on second results of executing second machine learning on second coupling weight coefficients provided for the active scanning and used between the layers and is configured to output the characteristic-amount data as the signal obtained by the reduction.

6. The data collecting device according to claim 2, wherein the first characteristic-amount extracting circuit reduces dimensions of input data and map data obtained by reducing the dimensions of the input data to the characteristic-amount data to be output.

7. An optical transmission system for an optical network, the optical transmission system communicating with a managing device and comprising:
a plurality of data collecting devices, each of which is installed in a node of the optical network and comprises
a receiver configured to receive an optical signal,
an optical-to-electrical converter configured to convert the optical signal received by the receiver into an electrical signal,
an analog-to-digital converter configured to convert the electrical signal into a digital signal,
a data reducing circuit having a neural network configured to map the digital signal to output-characteristic-amount data, the data reducing circuit configured to reduce the digital signal output from the analog-to-digital converter by discarding any of the output-characteristic-amount data within a predefined amount of normal-characteristic-amount data representing normal transmission of data through the optical network, and including a characteristic-amount extracting circuit having a reconfigurable-layered configuration with an input layer, an output layer including a first number of multi-input single-output units smaller than a second number of multi-input single-output units included in the input layer, and a hidden layer provided between the input layer and the output layer, the hidden layer configured to map the digital signal output by the analog-to-digital converter to the output-characteristic-amount data provided for analysis and output, based on the results of executing machine learning on coupling weight coefficients to be used between the layers
a transmitter configured to transmit, to the managing device that manages the data collecting device, a signal obtained by reducing the digital signal by the data reducing circuit, the managing device configured to include a memory and a processor coupled to the memory and to analyze an abnormal state of abnormal characteristic-amount data among collected characteristic-amount data transmitted by the plurality of data collecting devices that is at least expected to be different from a normal state.

8. The optical transmission system according to claim 7, wherein
the memory is a data accumulation memory configured to store characteristic-amount data received from the plurality of data collecting devices and including an abnormal state, and
the processor is a multidimensional data analyzing processor configured to analyze the reduced data accumulated in the data accumulation memory and to output an analysis result.

9. The optical transmission system according to claim 7, wherein the normal-characteristic-amount data is generated by a transmission simulator that simulates normal transmission of data through the optical network.

10. The data collecting device according to claim 1, wherein the normal-characteristic-amount data is generated by a transmission simulator that simulates the normal transmission of data through the optical network.

\* \* \* \* \*